United States Patent Office

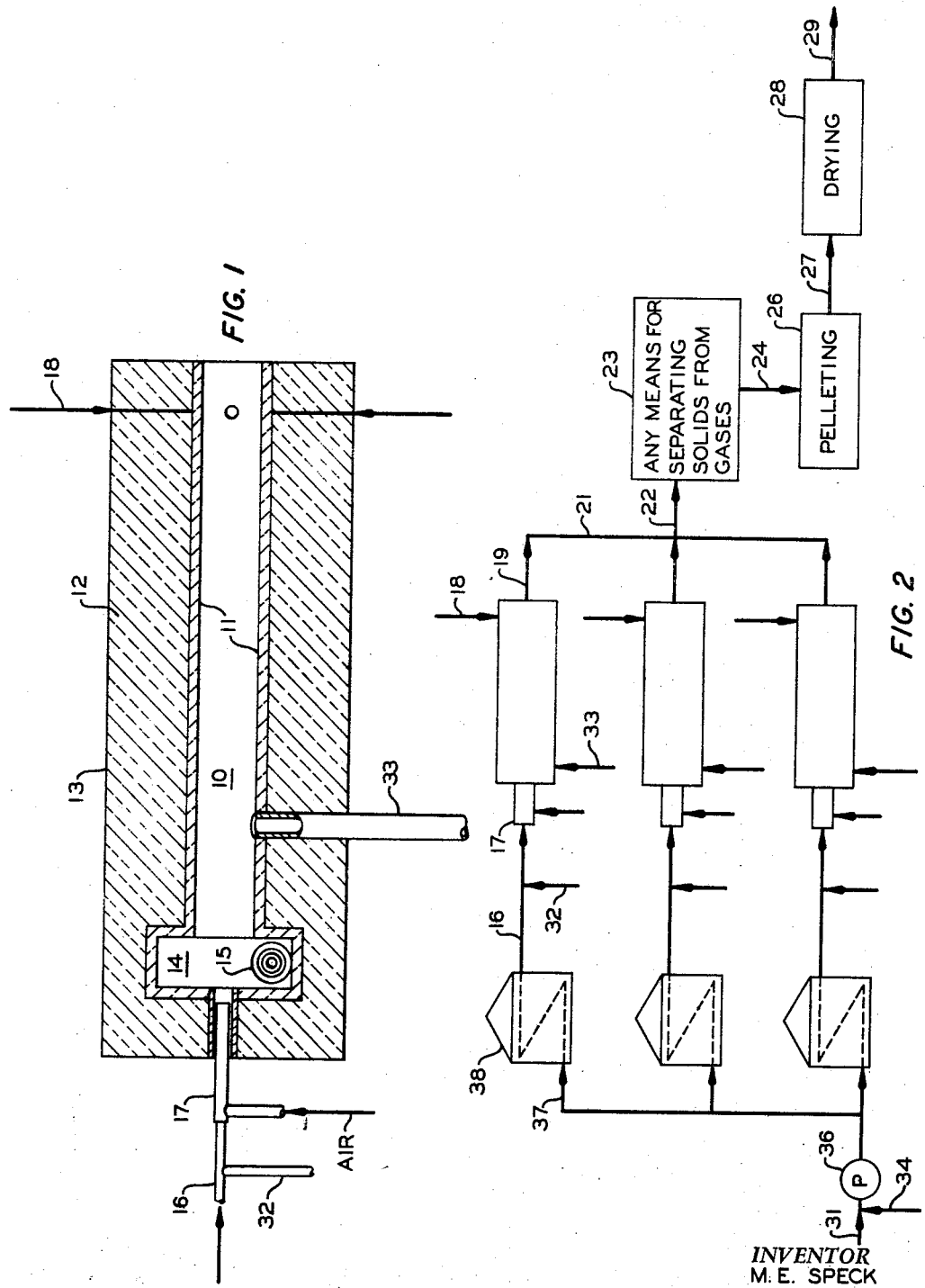

3,494,740
Patented Feb. 10, 1970

---

3,494,740
PRODUCTION OF CARBON BLACK
Morris E. Speck, Borger, Tex., assignor to Phillips Petroleum Company, a corporation of Delaware
Continuation-in-part of application Ser. No. 421,188, Dec. 28, 1964. This application July 1, 1968, Ser. No. 744,254
Int. Cl. C09c 1/48
U.S. Cl. 23—209.4                        2 Claims

---

ABSTRACT OF THE DISCLOSURE

Carbon black having a reduced structure is produced by introducing into the reaction zone of a carbon black furnace an additive comprising a metal selected from the group consisting of nickel, vanadium, iron, cobalt, and mixtures thereof, in an amount within the range of from 1 to 80 parts by weight per million parts by weight of the hydrocarbon feedstock to said furnace. In one preferred embodiment said additive is incorporated into said feedstock at a point upstream from the feedstock preheater so as to also prevent and/or remove deposits of coke or other carbonaceous material in said preheater.

---

This application is a continuation-in-part of copending application Ser. No. 421,188, filed Dec. 28, 1964, now abandoned.

This invention relates to the production of carbon black. In one aspect this invention relates to the production of a carbon black product having a lowered structure.

For several years carbon black has been produced in large quantities in furnaces. The larger part of the carbon black produced today is used as a reinforcing agent for rubber. By far the larger part of the compounded rubber material containing carbon black is designed specifically for tire treads or tire carcasses. The state of the rubber compounding art has advanced to such a degree that the properties of the carbon black used in such compounding must be controlled within narrow limits. Such a control of all of the desired properties of the carbon black is oftentimes difficult to achieve.

One of the most important properties of a carbon black when used in the compounding of rubber for use in tire manufacturing is commonly referred to as "structure." There is a good correlation between the structure of a carbon black and the modulus of a rubber product compounded with said carbon black. Other properties being comparable, high structure carbon blacks normally yield high modulus rubber and low structure carbon blacks normally yield low modulus rubber. By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains.

Since it is not convenient to measure the structure directly, the oil absorption of the black is commonly used as a "measure" of the structure. It has been found that the oil absorption of a carbon black correlates closely with certain properties, such as modulus, of a rubber having the carbon black compounded therein. Measurement of oil absorption gives a quick reliable measure of the structure of the carbon black. It is thus possible to obtain a rapid measure of one of the most important properties of carbon black insofar as rubber compounds prepared with said carbon black are concerned.

Despite the widespread and increasing use of furnace blacks in applications formerly served by channel blacks there are some uses for which channel blacks are still regarded as superior by some persons skilled in the art. For example, in reinforcing natural rubber-products and is specific applications, for example, in non-squeal, soft-riding tires, the low modulus of the channel blacks makes them particularly desirable for such uses. It is thus desirable to furnish the art with a furnace black having properties, particularly structure and modulus properties, more nearly like those of channel black. This is particularly so in view of the fact that channel blacks are gradually increasing in cost and being priced out of the market due to increasing cost of the raw natural gas materials from which they are made.

It is sometimes impossible or extremely difficult to obtain precisely the desired structure on a carbon black product by controlling the furnace conditions without adversely affecting other physical properties and/or the yield of the carbon black. I have now discovered a method of controlling or adjusting the oil absorption or structure of a carbon black product produced in a furnace process which overcomes the above-described difficulties. This is accomplished by the introduction of a substance comprising a metal selected from the group consisting of nickel, vanadium, iron, and cobalt, and mixtures thereof, in any suitable form, into the reaction zone of the carbon black producing furnace.

Thus, broadly speaking, the present invention resides in: introducing into the reaction zone of a carbon black producing furnace an additive comprising a metal selected from the group consisting of nickel, vanadium, iron, cobalt, and mixtures thereof, in a small but effective amount sufficient to controllably decrease the structure of the carbon black produced in said furnace.

An object of this invention is to provide valuable carbon blacks and methods of making the same. Another object of this invention is to provide a process for producing a furnace carbon black having a decreased structure or oil absorption value. Another object of this invention is to controllably decrease the structure or oil absorption of a furnace carbon black produced by the partial burning of a hydrocarbon under carbon black producing conditions in a carbon black furnace. Another object of this invention is to provide a process for making a furnace carbon black, from a given hydrocarbon feedstock, having a lower structure than would normally be produced from said hydrocarbon feedstock. Another object of this invention is to provide additives which when blended with a conventional feedstock will enable the production of a lower structure furnace carbon black from said feedstock than would otherwise be obtained from said feedstock. Another object of this invention is to provide a process for regulating and controlling the properties of furnace carbon blacks so as to satisfy prescribed and predetermined requirements for the properties of said carbon blacks. Still another object of this invention is to provide a method for controlling and counteracting variations which exist or occur in the properties of hydrocarbons used as feedstocks in furnace carbon black processes, which variations would normally considerably modify the quality of the carbon black produced in said furnace carbon black process. Other aspects, objects, and advantages of the invention will be apparent to those skilled in the art in view of this disclosure.

Thus, according to the invention, there is provided a process for producing a furnace carbon black, which process comprises: introducing a normally liquid hydrocarbon feedstock into a carbon black producing furnace; introducing an additive comprising a metal selected from the group consisting of nickel, vanadium, iron, cobalt, and mixtures thereof into said furnace, said additive being in addition to any naturally occurring metal compound which may be present in said feedstock and being introduced in a small but effective amount sufficient to lower the structure characteristics of said carbon black; partially burning said feedstock under carbon black producing conditions in said furnace in the presence of said additive; and recovering carbon black product from the effluent from said furnace.

I am aware that some crude oils contain small quantities of some heavy metals such as vanadium, nickel, iron, chromium, and molybdenum. It is generally agreed that said metals, at least in part, are present in said oils in the form of oil-soluble metallo-organic compounds. However, as pointed out in U.S. Patent 2,914,418 to Eastman, oils containing such heavy metals have previously been considered unsuitable as feedstocks to carbon black producing processes. Eastman discloses a process for producing an unusual type of carbon black from such oils. Said Eastman process is described in said patent as comprising reacting a liquid hydrocarbon "with free oxygen and steam in relative proportions such that the hydrocarbon is converted to substantially maximum amounts of carbon monoxide and hydrogen while at the same time a substantial amount of the carbon contained in the oil is released as free carbon." Eastman points out that the oil is directly admixed with and reacted with the steam and oxygen. Eastman also points out that all of the heat, other than preheat, is supplied by the reaction. Eastman further points out that, in contrast to his process, in conventional furnace-black processes, the oil is subjected to cracking by injection, with or without added air or oxygen, into a reaction zone wherein at least a portion of the heat required for the process is supplied by supplement combustion.

From the above it is clear that the carbon black producing process of Eastman is completely different from the carbon black producing process which is used as the basic process in the practice of my invention. Furthermore, Eastman describes in detail the properties of his carbon black product, and it is clear that the carbon black produced by his process is different from the carbon black produced in accordance with my invention. So far as I am aware no one, prior to my invention, has deliberately introduced one or more of the heavy metals nickel, vandium, iron, or cobalt into the reaction zone of a carbon black producing furnace in the manner and in the amounts used in my invention and obtained the results which are obtained in the practice of my invention. Thus, it is to be understood that in the practice of my invention the additive metal or metal-containing compound introduced into the reaction zone of the carbon black furnace is in addition to any naturally occurring metal or metal compound which may be present in the liquid hydrocarbon feedstock.

In the practice of the invention, the above-described metal additives can be obtained from any source which can be introduced into the reaction zone of the carbon black producing furnace. The only essential requirement is that the additive be present in said reaction zone at the time the carbon black is formed. Thus, it is within the scope of the invention to utilize said metal additives in elementary from such as the finely divided metal. It is also within the scope of the invention to utilize inorganic compounds of said metals such as the chloride, sulfate, oxide, nitrate, carbonate, etc. The utilization of so-called organic metal-containing compounds such as metallo-organic compounds, salts of organic acids including fatty acids, chrome alkyls, etc., is also within the scope of the invention.

This, as used herein and in the claims, unless otherwise specified, the terms "nickel," "vanadium," "iron," and "cobalt" are each employed generically and include all forms of said metals, e.g., finely divided metal, inorganic compounds of said metals, and "organic" compounds containing one or more of said metals, in which the additives of the invention can be introduced into the reaction zone of the carbon black furnace; it being further understood that the additives of the invention are in addition to any naturally occurring forms of said metals which may be present in the hydrocarbon feedstock, as described above.

Examples of inorganic compounds of said metals which can be utilized in the practice of the invention include, among others, the following: the ammonium sulfates, the arsenides, the bromides, the chlorides, the oxychlorides, the fluorides, the iodides, the carbonates, the oxides, the hydroxides, the nitrates, the sulfates, the sulfides; and the various nickel hexammine salts such as hexammine nickel (II) chloride, hexammine nickel (II) bromide, and hexammine nickel (II) nitrate.

Examples of "organic" metal-containing compounds which can be utilized in the practice of the invention include, among others, the following: the acetates, the formates, the naphthenates, the oleates, the lanolates, the tartrates, the citrates, the bezoates, and the sulfonates of said metals.

Many of the above-named and other metal-containing compounds exist in forms having water of crystallization associated therewith. Such compounds can be used with or without the associated water or crystallization. Also, many of said metal-containing compounds exist in forms wherein the metal has a different valence, e.g., (ic) or (ous) forms; each can be utilized in the practice of the invention.

The amount of an additive of the invention which can be introduced into the reaction zone of the carbon black producing furnace can vary within rather wide limits depending upon the exact nature of the carbon black forming reaction being utilized, the properties of the hydrocarbon feedstock being utilized, and the desired amount of lowering or regulation of the structure or oil absorption of the black carbon product. Since it is the metal itself which is the effective component in the additive substances comprising nickel, vanadium, iron, cobalt, or mixtures thereof, and since said metal is effective regardless of what it is present in, it is more convenient to express the amount of additive utilized in terms of the metal itself. In all instances, the amount of additive utilized will be a small but effective amount sufficient to effect the desired lowering or control of the carbon black structure or oil absorption. In general, the amount of additive utilized will be a small but effective amount within the range of from 1 to 80, preferably 1 to 50, more preferably 1 to 30 parts by weight of metal per million parts by weight of the hydrocarbon charged to the carbon black producing furnace.

FIGURE 1 illustrates one form of apparatus which can be employed in the practice of the invention.

FIGURE 2 is a diagrammatic flow sheet illustrating various methods of practicing the invention.

The invention is not limited to employing any particular type of carbon black furnace and/or apparatus for carrying out the method of the invention. FIGURE 1 illustrates in diagrammatic form the general construction and the general shape of one presently preferred type of carbon black furnace which can be employed in the practice of the invention. Referring now to said FIGURE 1, a reaction chamber or section 10 has a refractory lining 11 made of a high refractory material such as sillimanite, alumina, or other refractory material suitable for the purpose. A steel shell 13 containing insulating material 12 surrounds said refractory liner. At the inlet end of the furnace there is a short section 14 having a diameter somewhat larger than the diameter of reaction section 10. This larger diameter section 14 is essentially a combustion chamber in which a cumbustible mixture of a gas, such as natural gas, and an oxygen containing gas, such as air, is burned. Said combustible mixture is injected into said combustion chamber 14 through an inlet tube 15 which is so positioned that the gases enter said combustiion chamber in a direction tangent to the cylindrical wall thereof. Upon continued injection of the combustible mixture, the flame and combustion products follow a spiral path toward the axis of the combustion chamber. When the spiral becomes less than the diameter of reaction section 10, the gaseous flow changes from a spiral to a helix, and following this latter pattern the gases remain adjacent the wall of reaction section 10 and finally pass into the jacketed cooler section 18 at the end of said reaction section.

Reactant hydrocarbon gas and oil, from a source not shown, passes through a preheater, see FIGURE 2, and finally passes through feed conduit 16 which is arranged axially so that feed introduced therethrough will pass axially through the furnace. Surrounding said feed conduct 16 is a larger conduit 17, called an "air jacket." The arrangement of said two conduits 16 and 17 defines an annular space through which it is intended to pass air into the furnace. Air passing through said annular space is intended to keep the inner end of the feed conduit 16 cool to prevent the dispostion of carbon thereon.

Positioned adjacent the downstream end of the reaction section 10 are a plurality of quench liquid inlet conduits 18. Said quench liquid inlet conduits are provided for the introduction of quenching liquid, usually water in liquid phase, into said reaction section to quickly quench the reaction mixture gases to a temperature below that at which carbon black formation takes place, preferably to a temperature lower than 2000° F. Quench inlet conduits 18 comprise four such inlets (three are shown) spaced 90° apart around the circumference of section 10. Any number of inlets arranged in any suitable radial pattern can be employed. It is desirable to employ at least two inlets in order to more effectively blanket the interior of the reaction section and thus more effectively quench the reaction. Each of said inlets is with a suitable spray nozzle (not shown) at the inner end thereof. The furnace can be provided with any suitable number of said quench fluid inlets arranged in any desired spacing.

The furnace just described has the general conformity and is constructed generally in the manner fully described in U.S. Patent 2,564,700. Various modifications of said furnace which can also be employed in the practice of the invention are also described in said patent. Other types of furnaces and apparatus which can also be employed in the practice of the invention are described in other patents mentioned in said Patent 2,564,700.

In the practice of the invention, the additive or carbon black structure depressant can be introduced into the reaction zone of the furnace along with the hydrocarbon feed, with the tangential fuel mixture, or directly into the reaction section of the furnace. Said depressant or additive is effective in any form and can be introduced at said locations in any suitable form, e.g., in solid, liquid, or vapor form. The only requirement is that it be present in the reaction zone at the time the carbon black is formed.

When said additive is utilized in the form of a solid such as a powdered metal-containing compound, or as the finely divided metal, it can be uniformly dispersed or suspended directly into the hydrocarbon feed in suitable mixing apparatus not shown and the resulting dispersion or suspension then introduced into reaction section 10 through feed conduit 16. Said finely divided solid can also be dispersed or suspended in a carrier which can then be uniformly dispersed in the hydrocarbon feed by introduction through conduit 32 into feed conduit 16.

If the metal-containing compound is directly soluble in a liquid reactant hydrocarbon feedstock, it can be dissolved directly in said feedstock and introduced into reaction section 10 through conduit 16. Said metal-containing compound can also be dissolved in a suitable solvent to form a solution which is then either mixed with the reactant hydrocarbon feedstock in suitable mixing apparatus, not shown, or introduced through conduit 32 into feed conduit 16 for mixing with said feedstock and introduction into reaction section 10. Many metal-containing compounds are soluble in organic solvents such as alcohols, ethers, acetones, etc. Any suitable solvent can be used for this purpose. Aqueous solutions of water soluble metal-containing compounds can also be used in the same manner. Said aqueous solutions can be introduced through conduit 32 or can be emulsified with the hydrocarbon feedstock prior to its introduction through conduit 16. It will be understood that any of the various described form of the additive can also be introduced via conduit 33 directly into reaction section 10. Since it is essential that the additive be present at the time the carbon black is formed, it is necessary that when it is introduced directly into combustion chamber 10 it be introduced into said chamber in the upstream one-third thereof, preferably immediately after the inlet to said chamber 10.

Since the additives or structure depressants of the invention are normally used in relatively low concentrations, it is usually advantageous to introduce same in as highly diluted or extended from as practical so as to facilitate maintaining a uniform addition rate and level of concentration. Thus, it is preferred to introduce said additive or depressant in the form of dilute aqueous solutions or similarly dilute organic solutions, or in the form of organic or aqueous emulsions which can be uniformly dispersed in the hydrocarbon feed. Although not specifically discussed in the preceding paragraph, it is within the scope of the invention to introduce the additive as a vapor at any of the above-described introduction points. Any suitable means can be employed for vaporizing the metal-containing compound. The most preferred sources of the additives are the water soluble compounds, or compounds which are soluble in an organic solvent or are directly soluble in the hydrocarbon feedstock.

In commercial operations for the production of carbon black, it is common practice to operate a plurality of carbon black furnaces or reactors in parallel charging the same hydrocarbon feedstock. The outlets of said reactors are manifolded together by means of a suitable header conduit and the effluent gases from a group of reactors being operated in parallel are passed to a common recovery system. Such a system for the production of carbon black is illustrated diagrammatically in FIGURE 2. Thus, in FIGURE 2 a liquid hydrocarbon feedstock from a source not shown is passed via header conduit 31, charge pump 36, and inlet conduit 37 into the coil of preheater 38. Effluent from said coil is passed via conduit 16 axially into the carbon black furnace as shown and as described in connection with FIGURE 1. Effluent gases from said furnace are passed via outlet conduit 19 into outlet header conduit 21, and then via conduit 22 into any suitable means 23 for separating solids from gases.

Said separating means or zone 23 can be any suitable means for separating solids from gases. Said means can comprise one or more cyclone separators operated in series, with the gaseous effluent from the last of said cyclones being passed through a bag filter. However, cyclone separators are not employed in some modern plants. Said cyclone separators and bag filters are conventional equipment. The carbon black recovered from said effluent gases in separating means 23 is then passed via conduit 24 into pelleting means or zone 26. Although not shown in the drawing, said conduit means 24 usually includes a hopper and means for mixing the carbon black product with sufficient water for satisfactory operations in said pelleting means. The pelleting operation carried out in pelleting means 26 is a conventional wet pelleting process. The wet pellets are then passed via conduit 27 into drying means 28 which can comprise any suitable number of conventional rotary or fluidized dryers.

While the invention has been described above with particular reference to reducing the structure characteristics of the carbon black produced, a number of other important results and advantages are realized in the practice of the invention. One of these is the more efficient operation of the bag filters. For some reason, not completely understood at present, the pressure drop across said bag filters is reduced an amount in the order of 1 to 2 inches of water. This result in an increased efficiency because the bags do not have to be cleaned as frequency as before.

Another advantageous result obtained in the practice of my invention is improved operation of the wet pelleting means. When using one of the above-described additives in the practice of the invention, it has been found that the flow of carbon black through the conduit means 24 is much smoother, e.g., there is much less tendency for the carbon black to agglomerate or otherwise restrict the flow in said conduit 24. Furthermore, the power requirements for the operation of said wet pelleting means are reduced and are much more uniform.

An outstanding advantageous result is obtained in the operation of preheater 38. In normal operation prior to my invention the coil in said preheater is subject to becoming foulded by gradual deposition of coke or other carbonaceous material therein. It is thus necessary at frequent intervals to take the coil out of service and remove said coke or carbonaceous material by heating said coil to a relatively high temperature and then blowing air therethrough. This is a costly process, not only from the standpoint of its own operation, but also from the standpoint that a reactor as well as the preheater is out of service, resulting in lost production capacity. In the practice of my invention when an additive of the invention is injected or dispersed in the oil charge upstream of said preheater coil, as by means of conduit 34 in FIGURE 2, this difficulty is eliminated. Thus, introduction of the additives of the invention upstream of charge pump 36 via said conduit 34 is a presently preferred point of introduction for the additives of the invention. This highly advantageous result is obtained with either continuous or intermittent injection of an additive of the invention. As shown in the examples given hereinafter, an aqueous dispersion of an additive of the invention into the normally liquid hydrocarbon oil charge by means of conduit 34 is highly efficient in reducing coil pressure and/or in maintaining said coil pressure at said operating levels. The introduction of water alone will not accomplish this result. Surprisingly, it has also been found that aqueous solutions of alkali metal compounds, e.g., potassium chloride, also will not accomplish this result.

All of the above-described advantageous results are illustrated and discussed further in connection with the examples given hereinafter.

The following examples will serve to further illustrate the invention.

EXAMPLE I

A series of runs was made in which a preheated aromatic concentrate oil having various amounts of a nickel oxide additive ($Ni_2O_3$) uniformly dispersed therein was introduced axially into each furnace of a bank of seven carbon black furnaces being operated in parallel in the manner illustrated in FIGURE 2 of the drawings and as described in connection with said drawings. Said furnaces were commercial size furnaces of essentially the same type as illustrated in FIGURE 1. The reaction section 10 was comprised of an upstream section having an internal diameter of 12 inches and a length of 11 feet, and a downstream section having an internal diameter of 15 inches and a length of 5.75 inches. Quench inlets 18 were located 12 feet and 4 inches from the upstream end of said recation section 10. Combustion chamber 14 was 37 inches in diameter and 12 inches long. Said nickel oxide additive was finely ground and then uniformly dispersed in water to form an aqueous dispersion. Said aqueous dispersion was uniformly dispersed in said oil by injection into the main charge oil heater upstream of the oil charge pump, similarly as illustrated by conduit 34 and pump 36 in FIGURE 2.

Said oil having said additive dispersed therein was partially burned in said furnaces under carbon black producing conditions to produce a HAF carbon black product. Said carbon black product was separated from the furnace effluent gases in conventional manner as illustrated and described in connection with FIGURE 2 of the drawings, and then tested. Tests were made on the composite product from the seven reactors. Operating conditions, yield, and tests on the carbon black product are set forth in Table I below. Run No. 1 is a control run wherein no additive was used.

TABLE I

|  | Run Number | | |
|---|---|---|---|
|  | 1 | 2 | 3 |
| Additive $Ni_2O_3$, concentration, p.p.m.[1] | 0 | 1 | 2 |
| Furnace Operating Conditions [2]: | | | |
| Oil feed rate, gal./hr | 240 | 240 | 240 |
| Oil preheat temp., °F | 790–810 | 790–810 | 790–810 |
| Tangential air rate, m.c.f.h | 154 | 154 | 154 |
| Tangential gas rate, m.c.f.h | 10.6 | 10.06 | 10.6 |
| Bag Filters, Pressure drop, inches $H_2O$ | 7.0 | ......... | 6.0 |
| Carbon Black Product: | | | |
| Yield, lbs./gal | 4.2 | ......... | 4.2 |
| Photelometer | 97 | 97 | 97 |
| $N_2$ surface area, m.²/g | 79 | 79 | 79 |
| Oil absorption, cc./g.[3] | 1.17 | 1.14 | 1.11 |
| Pour density, lbs./cu. ft | 21.0 | 21.5 | 22.5 |
| Rubber Properties, 300% Modulus, p.s.i.: | | | |
| 15′ cure | +120 | ......... | +75 |
| 30′ cure | +140 | ......... | +35 |

[1] Parts by weight of nickel metal per million parts by weight of oil feedstock.
[2] Average conditions per reactor.
[3] Determined on loose black, other carbon black properties determined on pelleted black.

From the data given in Table I above, it is seen that the addition of a very low concentration of a nickel-containing compound to the reaction zone of a carbon black producing furnace will lower the oil absorption and related structure of the carbon black product without adversely affecting the yield and other important properties to any significant degree. The invention thus provides a method which will permit adjustment of the structure of the carbon black product without significantly altering its other properties. The method of the invention is particularly valuable for counteracting variations in the feedstock which would cause undesired variations in the structure of the carbon black product.

The above data in Table I show that the HAF black made in accordance with the invention had a decreased structure (as shown by the oil absorption values and modulus values), and the density of the pelleted black was increased. There was obtained an increase in efficiency in the operation of the bag filters as shown by the decrease in pressure drop across said filters. Furthermore, there was obtained an increase in efficiency in the wet pelleting operations as shown qualitatively by improved and more uniform flow into the wet mixer and by more uniform and reduced power requirements in the runs where the nickel additive was used.

EXAMPLE II

Another series of runs was carried out using essentially the same oil feedstock and nickel oxide additive dispersed in said oil in the same manner as in Example I. These runs were carried out in a bank of five reactors or furnaces operated in parallel as illustrated and described in connection with FIGURE 2 of the drawings. Said furnaces were substantially like the furnace illustrated in FIGURE 1 of the drawings except that reaction section 10 was comprised of an upstream portion having an internal diameter of 12 inches and a length of 3.5 feet, and a downstream portion having an internal diameter of 15 inches and a length of 12 feet and 7.75 inches. The quench inlets 18 were locaed 4 feet from the upstream end of said reaction section 10.

The charge oil having the additive dispersed therein was partially burned in said furnaces under carbon black producing conditions to produce an ISAF carbon black product. Said carbon black product was separated from the furnace effluent gases in conventional manner as illustrated and described in connection with FIGURE 2 of the drawings, and then tested. Tests were made on the composite product from the five reactors or furnaces. Operating conditions, yield, and tests on the carbon black product are set forth in Table II below. Run No. 1 is a control run wherein no additive was used.

TABLE II

| | Run Number | | |
|---|---|---|---|
| | 1 | 2 | 3 |
| Additive $Ni_2O_3$, concentration, p.p.m.[1] | 0 | 1 | 2 |
| Furnace Operating Conditions [2]: | | | |
| Oil feed rate, gal./hr | 260 | 260 | 260 |
| Oil preheat temp., °F | 790-810 | 790-810 | 790-810 |
| Tangential air rate, m.c.f.h | 229 | 229 | 229 |
| Tangential gas rate, m.c.f.h | 16 | 16 | 16 |
| Bag Filters, Pressure drop, inches $H_2O$ | 6 | | 5.25 |
| Carbon Black Product: | | | |
| Yield, lbs./gal | 3.4 | | 3.4 |
| Photelometer | 98 | 98 | 98 |
| $N_2$ surface area, m.$^2$/g | 120 | 120 | 120 |
| Oil absorption, cc./g.[3] | 1.18 | 1.13 | 1.08 |
| Pour density, lbs./cu. ft | 21.0 | 21.5 | 22.5 |
| Rubber Properties, 300% Modulus, p.s.i.: | | | |
| 15′ cure | −60 | | −50 |
| 30′ cure | −190 | | −250 |

[1] Parts by weight of nickel metal per million parts by weight of oil feedtock.
[2] Average conditions, per reactor.
[3] Determined on loose black, other carbon black and rubber properties determined on pelleted black.

The above data in Table II show that the ISAF black made in accordance with the invention also had a decreased structure and the density of the pelleted black was increased. An increase in efficiency of operation of the bag filters was also obtained as in the runs in Example I. Again, substantially the same increase in efficiency of the wet pelleting operation was noted.

EXAMPLE III

In another series of runs nickel sulfate ($NiSO_4 \cdot 6H_2O$) was used as the additive. This series of runs was made employing five reactors operated in parallel and was carried out in substantially the same manner as described above in Example I. The results obtained were similar to those set forth above in Table I.

EXAMPLE IV

In another series of runs nickel chloride ($NiCl_2 \cdot 6H_2O$) was used as the additive. This series of runs was made employing seven reactors operated in parallel and was carried out in substantially the same manner as described above in Example I. The results obtained were similar to those set forth above in Table I.

EXAMPLE V

In another series of runs vanadium pentoxide ($V_2O_5$) was used as the additive. The finely ground additive was dispersed in water to form a 15 weight percent dispersion which was then dispersed in the oil feedstock as described above in Example I. Said feedstock was basically the same aromatic concentrate oil as used in Example I. This series of runs was carried out in a group of 14 reactors operated in parallel in essentially the manner illustrated in FIGURE 2 of the drawings. Said furnaces were of a tangential flame type similar to the furnace illustrated in FIGURE 1 except that they had no precombustion chamber 14. The reaction chamber 10 had an internal diameter of 15 inches and the quench point 18 was located 12 feet and 6.25 inches from the upstream end of reaction section 10. The essential features of such a furnace are illustrated in FIGURES 2 and 3 of U.S. Patent 2,800,394 and in U.S. Patent 2,375,795.

Said oil having said additive dispersed therein was partially burned in said furnaces under carbon black producing conditions to produce a FEF carbon black product. Said carbon black product was separated from the furnace effluent gases in conventional manner as described in Example I, and then tested. Operating coditions, yield, and test results are set forth in Table III below.

TABLE III

| | Run Number | | |
|---|---|---|---|
| | 1 | 2 | 3 |
| Additive $V_2O_5$, concentration, p.p.m.[1] | 0 | 1 | 2 |
| Furnace Operating Conditions [2]: | | | |
| Oil feed rate, gal./hr | 130 | 130 | 130 |
| Oil preheat temp., °F | 790-810 | 790-810 | 790-810 |
| Tangential air rate, m.c.f.h | 45.8 | 45.8 | 45.8 |
| Tangential gas rate, m.c.f.h | 16.8 | 16.8 | 16.8 |
| Bag Filters, Pressure drop, inches $H_2O$ | 6.5 | 5.75 | 5.0 |
| Carbon Black Product: | | | |
| Yield, lbs./gal | 4.5 | | 4.5 |
| Photelometer | 95 | 95 | 95 |
| $N_2$ surface area, m.$^2$/g | 42.5 | 42.5 | 42.5 |
| Oil absorption, cc./g.[3] | 1.15 | 1.10 | 1.08 |
| Pour density, lbs./cu. ft | 21.8 | 21.8 | 22.8 |
| Rubber Properties, 300% Modulus, p.s.i.: | | | |
| 15′ cure | +160 | | +80 |
| 30′ cure | +140 | | +30 |

[1] Parts by weight of vanadium metal per million parts by weight of oil feedstock.
[2] Average conditions, per reactor.
[3] Determined on loose black, other carbon black properties determined on pelleted black.

The above data in Table III show that the FEF black made in accordance with the invention using a vanadium additive also had a decreased structure and the density of the pelleted black was increased. An increase in efficiency of operation of the bag filters was also obtained as in the runs in Examples I and II using other additives of the invention. Again, substantially the same increase in efficiency of the wet pelleting operation was noted.

EXAMPLE VI

For comparison purposes a series of runs was made wherein potassium chloride was used as the additive. This series of runs was made for the production of FEF black and was carried out in essentially the same manner as described above in Example V. Amounts of additive used, tests on the carbon black product, yield, and rubber tests are set forth in Table IV below.

For comparison purposes another series of runs using potassium chloride as the additive was made for the production of HAF black. This series of runs was carried out in essentially the same manner as described above in Example I. Amounts of additive used, tests on the carbon black product, yield, and rubber tests for this series of runs are also set forth in Table IV below.

TABLE IV
[FEF Black]

| Run No. | KCl p.p.m. K | Oil[1] Abs. cc./g. | Density, lb./cu. ft. | $N_2$ S.A. m.$^2$/g. | Yield, lb./gal. | 300% modulus | |
|---|---|---|---|---|---|---|---|
| | | | | | | 15′ | 30′ |
| 1 | 0 | 1.17 | 21.8 | 42.5 | 4.5 | +180 | +200 |
| 2 | 1 | 1.15 | 21.8 | 42.5 | 4.5 | +180 | +200 |
| 3 | 2 | 1.14 | 21.8 | 42.5 | 4.5 | +180 | +200 |
| 4 | 3 | 1.13 | 21.8 | 42.5 | ([2]) | +180 | +200 |
| 5 | 4 | 1.11 | 21.8 | 42.5 | ([2]) | +180 | +200 |
| 6 | 5 | 1.09 | 21.8 | 42.5 | ([2]) | +180 | +200 |
| 7 | 6 | 1.08 | 23.0 | 42.5 | 4.5 | +100 | +80 |
| [HAF Black] | | | | | | | |
| 8 | 0 | 1.16 | 21.5 | 79 | 4.2 | +220 | +190 |
| 9 | 1 | 1.14 | 21.5 | 79 | 4.2 | +220 | +190 |
| 10 | 2 | 1.12 | 21.5 | 79 | ([2]) | +220 | +190 |
| 11 | 3 | 1.10 | 21.5 | 79 | ([2]) | +220 | +190 |
| 12 | 4 | 1.09 | 21.5 | 79 | 4.2 | +130 | +180 |

[1] Determined on loose black, other carbon black properties determined on pelleted black.
[2] Not measured.

Comparison of the above data in Table IV for FEF black using KCl as additive with the data given above in Table III using $V_2O_5$ as additive shows that vanadium is more effective than potassium. For example, comparing Runs 1 and 3 of Table III with Runs 1 and 3 of Table IV shows that 2 p.p.m of vanadium decreased the oil absorption 0.07 cc. per gram, whereas 2 p.p.m. of potassium decreased the oil absorption only 0.03 cc.

per gram, showing the vanadium to be 2.5 times as effective as the potassium.

Similarly, comparing Runs 1 and 3 of Table I with Runs 8 and 10 of Table IV shows that 2 p.p.m. of nickel decreased the oil absorption 0.06 cc. per gram, whereas 2 p.p.m. of potassium decreased the oil absorption only 0.04 cc. per gram.

EXAMPLE VII

As mentioned above, one of the important advantages of the invention is that when an additive of the invention, e.g., a nickel compound such as nickel sulphate, is dispersed in the oil feedstock upstream from the oil preheaters, said additive also serves to maintain pressures at the coil inlets in said preheaters at satisfactory operating levels by preventing and/or removing deposits of coke or other carbonaceous material in said coils.

In a series of runs carried out on a group of 14 reactors operating in parallel substantially as described in Example V above, and injecting various additive materials on the suction side of the oil charge pump (conduit 34 in FIGURE 2), the results set forth in Table V below were obtained. During these runs, 14 preheaters were in operation at an average oil rate of 125 gallons per hour for a total oil charge of 2000 gallons per hour and preheating said oil to temperatures within the range of 740 to 760° F.

TABLE V

| Operating time, hrs. | Average coil pressure, lbs. | Additive injection, type and rate |
| --- | --- | --- |
| Run No. 1 | | |
| 4 | 65 | Continuous injection of 15 wt. percent aqueous solution of nickel sulfate at rate of 100 ml. per minute. Oil preheat temp.=740° F. |
| 8 | 62 | |
| 0 | 44 | |
| 0 | 43 | |
| Run No. 2 | | |
| 0 | 43 | Continuous injection of water only at rate of 100 ml. per minute. Oil preheat temp.=740° F. |
| 24 | 49 | |
| 50 | 58 | |
| Run No. 3 | | |
| 0 | 58 | Continuous injection of 3.5 wt. percent potassium chloride aqueous solution at rate of 30 ml. per minute. Oil preheat temp.=740° F. |
| 24 | 68 | |
| 52 | 79 | |
| Run No. 4 | | |
| 0 | 62 | Continuous injection of 12 wt. percent nickel sulphate aqueous solution at rate of 40 ml. per minute. Oil preheat was 740° F. at start and was increased to 760° F. after about 60 to 72 hours operation. |
| 24 | 62 | |
| 48 | 52 | |
| 72 | 61 | |
| 96 | 63 | |
| 120 | 65 | |
| 144 | 63 | |
| 168 | 67 | |
| 192 | 58 | |
| 218 | 48 | |
| Run No. 5 | | |
| 0 | 43 | Intermittent injection of 12% aqueous solution of nickel sulphate at rate of 40 ml. per minute for 30-minute periods every four hours. |
| 24 | 44 | |
| 72 | 41 | |
| 96 | 45 | |
| 120 | 43 | |
| 144 | 45 | |
| 168 | 42 | |
| 192 | 45 | |

The data in the above Table V shows the following. Run No. 1 shows that aqueous solution of nickel sulphate is effective in preventing increase in coil inlet pressure since said pressure decreased throughout the run. Run No. 2 shows that water only is not effective to prevent increase in coil inlet pressure since said pressure increased throughout the run. Run No. 3 shows the potassium chloride solution used was not effective to prevent increase in coil inlet pressure since said pressure increased throughout the run. Run No. 4 confirms the results obtained in Run No. 1, even though the preheat temperature was increased 20° F. during said Run No. 4. Run No. 5 shows that intermittent injection of nickel sulphate solution is also effective in preventing increase in coil inlet pressure.

The aromatic concentrate oils used in the runs of the above examples were conventional commercial carbon black feedstocks which had been prepared in known manner by liquid sulfur dioxide extraction of cycle oils obtained in the catalytic cracking of gas oils. A typical oil had the following properties:

| | |
| --- | --- |
| API gravity | 11.0 |
| Vacuum distillation, ° F. at 760 mm.: | |
| First drop | 470 |
| 5 | 558 |
| 10 | 587 |
| 20 | 611 |
| 30 | 639 |
| 40 | 660 |
| 50 | 681 |
| 60 | 711 |
| 70 | 761 |
| 80 | 820 |
| 90 | [1] 867 |
| Bureau of Mines correlation index | 90.4 |
| Viscosity: | |
| SUS at 100° F. | 81.9 |
| SUS at 210° F. | 37.6 |
| Carbon _____weight percent__ | 88.8 |
| Hydrogen _____do____ | 9.5 |
| Sulfur _____do____ | 1.29 |
| Ramsbottom carbon residue __do__ | 1.61 |
| BS&W, _____volume percent__ | 0.17 |
| Pentane insolube _____weight percent__ | 0.44 |
| Pour point _____° F__ | 45 |
| Aniline point _____do____ | 93.6 |
| Refractive index _____20/D__ | 1.5854 |

[1] 82%.

The above-described aromatic concentrate oil is representative of one presently preferred feedstock for use in the practice of the invention. However, conventional aromatic oils used in the production of furnace carbon blacks can include oils other than extract oils produced by liquid sulfur dioxide extraction of cycle oils. Typical properties of conventional aromatic oils are: boiling range 400–1000° F., BMCI 75 to 130, and an API gravity of from about 0 to about 20°.

The invention is not to be limited to the use of such aromatic concentrate oils. Other oils, such as kerosene, gasoline boiling range hydrocarbons, heavy or light naphthas or oils even heavier than recycle gas oils can be used. The feed can be injected as a liquid through a spray or atomizer, although I prefer to operate with the feed injected at least partially as a vapor. Hydrocarbons from other sources than petroleum likewise are suitable, as for example, coal tar distillates, and shale distillates can be used. These charge stocks may contain most any class of hydrocarbon compound, as for example, saturated or unsaturated hydrocarbons, paraffins, olefins, aromatics, naphthenes or any others which might become available.

While it is not intended to limit the invention to any theory of operation, it is presently believed that the depressing effect of the additives of the invention on the carbon black structure is due to some modification of the carbon black forming reaction itself which results in the metal additive being retained in or on the carbon black product. It has been noted that said metal additive or depressant must be present during the carbon black forming reaction. Introduction of said additive at the downstream end of the reaction zone results in little, if any, effect on the structure of the carbon black product. It is presently believed that the action of the additive is due, in some way not presently known, to the presence of metal ions in the reaction section of the furnace during the formation of the carbon black. It has been noted that the nature of the anionic portion, in the case of inorganic metal-containing compounds, or of the organic portion, in the case of organic metal-containing compounds, is of secondary importance. Thus, the metal itself, in some active form during the formation of the carbon black product, appears to be the active depressant of the invention.

Analyses have shown in carbon black producing runs wherein a metal-containing compound is included in the hydrocarbon feedstock that from 75 to 100 percent of the metal (calculated as the metal) is retained in or on the carbon black product. Just what form, e.g., oxide or other, said retained metal is in, or just how it is associated with the carbon black particles themselves, is not presently known. It is clear, however, that the metal, in some form and some manner of association, is present in the carbon black product in small but effective amounts sufficient to appreciably lower the structure of said carbon black product. The amount said structure is lowered will depend upon the amount of metal or metal-containing compound present in the carbon black forming zone and the nature of the hydrocarbon feedstock.

The BMCI correlation index referred to is a correlation index developed by the Bureau of Mines and is employed to denote aromaticity of an oil; a higher numerical index denoting a more aromatic oil. The index is calculated from the formula $$C.I. = \frac{48640}{K} + 473.7G - 456.8$$

where:

C.I.=Bureau of Mines correlation index
K=Average boiling point (° K.)
G=Specific gravity @ 60° F./60° F.

Oil absorption is measured by adding oil a few drops at a time to a one gram sample of carbon black on a mixing stone or glass plate. After each addition the oil is incorporated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black, or converted to gallons of oil per 100 pounds of black.

The photelometer test is a measure of the tar content and thus a measure of the quality of the carbon black product. The tar content of carbon black is determined by mixing 2 grams of black with 50 cc. of chloroform, boiling the mixture, filtering, and determining the percentage light transmittance of the filtrate as compared with the transmittance of a blank sample of chloroform. The comparison is preferably conducted with a photoelectric colorimeter such as a Lumetron colorimeter at a wavelength of 440 m$\mu$, a light intensity of 20, and a cell 1 cm. long. A tar-free black is arbitrarily defined as one that shows in tests on samples taken after pelleting a transmittance greater than 85 percent according to this procedure. Pelleting the flocculent black (not disclosed) by the conventional processes raises the photelometer number 5 points, or more, from 80 to 85 for example. Acetone is sometimes substituted for chloroform in the test procedure. The percent transmittance equivalent to 85% with chloroform is about 92% with acetone. The original acetone or chloroform used for the test should be substantially colorless. When the term "photelometer" is used without naming the solvent, the convention in the art is that chloroform is the solvent employed.

The pour density values reported herein were determined in accordance with ASTM D1513–60.

In the above tables the term "300 percent modulus, p.s.i." refers to the pounds per square inch pull in a tension test piece of vulcanized rubber which has been stretched 300 percent of the length of the original test piece. Said tests are usually determined in accordance with ASTM D412–51T, and are carried out at 80° F. unless otherwise designated. The rubber samples for said tests were prepared according to standard procedures using the following compounding recipe and then curing the samples at 293° F. for the indicated periods of time.

Compounding recipe: Parts by weight
Natural rubber (#1 smoked sheet) _____ 100
Carbon black _____ 50
Stearic acid _____ 3
Zinc oxide _____ 5
Altax (benzothiazyl disulfide) _____ 0.6
Sulfur _____ 2.5

For comparison purposes rubber compositions were compounded and cured according to the same procedures, using samples of the same natural rubber, but using IRB No. 1 (Industry Reference Black No. 1) as a standard carbon black. The modulus values reported herein are the differences between the actual values obtained on the test run samples and the actual values obtained on the samples compounded with the standard IRB No. 1 black, i.e., the deviation from the standard.

While I have given as illustrative embodiments some examples using the helical or tangential flame furnaces which are shown in prior patents cited above, my invention is not limited thereto but is clearly applicable to other furnace carbon black processes, such as those set forth in Ayers Re. 22,886 of June 3, 1947; Hanson, 2,368,828, of Feb. 6, 1945; Miller, 1,807,321, of May 26, 1931; Wiegand, 2,378,055, of June 12, 1945; and 2,440,-424 of Apr. 27, 1948, and numerous other furnace processes.

While certain embodiments of the invention have been described for illustrative purposes, the invention obviously is not limited thereto. Various other modifications will be apparent to those skilled in the art in view of this disclosure. Such modifications are within the spirit and scope of the invention.

That which is claimed is:

1. A process for producing a furnace carbon black which process comprises introducing into a carbon black furnace a normally liquid aromatic concentrate oil feedstock having dispersed therein an additive comprising vanadium oxide, said additive being present in said feedstock in a small but effective amount, sufficient to reduce the structure characteristics of said carbon black, within the range of from 1 to 80 parts by weight of said metal per million parts by weight of said feedstock, and said additive being in addition to any naturally occurring metal which may be present in said feedstock; partially burning said feedstock under carbon black producing conditions in said furnace in the presence of said additive; and recovering from the effluent from said furnace a carbon black product having a lower structure than would normally be produced from said feedstock.

2. In the process for producing a furnace carbon black by the decomposition of a normally liquid hydrocarbon feedstock wherein said hydrocarbon feedstock is injected into a carbon black furnace having a reaction zone, and is therein partially burned under carbon black producing conditions to form carbon black in gaseous suspension and said carbon black is thereafter separated from the resultant furnace effluent gases and collected, and by which process a furnace carbon black of relatively high structure is normally produced, the method of reducing the structure characteristics of the carbon black so produced, which method comprises: introducing into a zone of said furnace, not further downstream than the zone thereof in which said burning of said hydrocarbon to carbon black occurs, an additive comprising vanadium oxide, effective under said furnace conditions to depress the extent of structure development in the carbon black produced, said additive being in addition to any naturally occurring metal which may be present in said feedstock; and proportioning said additive in an amount within the range of from 1 to 80 parts by weight of said metal per million parts by weight of said hydrocarbon feedstock to obtain the required reduction in structure.

References Cited

UNITED STATES PATENTS

| | | | |
|---|---|---|---|
| 2,356,471 | 8/1944 | Rehner | 23—209.8 |
| 2,914,418 | 11/1959 | Eastman | 23—209.4 X |
| 3,010,794 | 11/1961 | Friauf et al. | 23—209.4 |
| 3,117,016 | 1/1964 | Smith | 23—209.4 X |
| 3,213,026 | 10/1965 | Jordan et al. | 23—209.4 X |

EDWARD J. MEROS, Primary Examiner

U.S. Cl. X.R.

23—209.6; 106—307